United States Patent
Jimenez, Jr. et al.

(10) Patent No.: US 12,086,909 B2
(45) Date of Patent: Sep. 10, 2024

(54) COMPUTED TOMOGRAPHY APPROACH TO EDGE RECONSTRUCTION

(71) Applicant: National Technology & Engineering Solutions of Sandia, LLC, Albuquerque, NM (US)

(72) Inventors: Edward Steven Jimenez, Jr., Albuquerque, NM (US); Cody M. Washburn, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 401 days.

(21) Appl. No.: 17/675,434

(22) Filed: Feb. 18, 2022

(65) Prior Publication Data
US 2023/0267658 A1    Aug. 24, 2023

(51) Int. Cl.
*G06T 11/00*    (2006.01)

(52) U.S. Cl.
CPC ................. *G06T 11/005* (2013.01)

(58) Field of Classification Search
CPC ..................................................... G06T 11/005
USPC ......................................................... 382/100
See application file for complete search history.

(56) References Cited

U.S. PATENT DOCUMENTS

2018/0033165 A1* 2/2018 Zeng ................... G06T 11/003

* cited by examiner

*Primary Examiner* — Stephen P Coleman
(74) *Attorney, Agent, or Firm* — Yee & Associates, P.C.; Gregory M. Doudnikoff

(57) ABSTRACT

A computer-implemented method of reconstructing boundaries from a computed tomography (CT) image dataset is provided. The method comprises receiving CT image data and applying a number of image filters to the CT image data. A numerical derivative is applied to the filtered CT image data to flatten and suppress non-edge regions that do not correspond to edges. Numerical derivative values are clipped to a specified range to reduce artifacts and noise, and an X-ray image is reconstructed according to the image filters and clipped numerical derivative values.

20 Claims, 5 Drawing Sheets

COMPUTED TOMOGRAPHY APPROACH TO EDGE RECONSTRUCTION

GOVERNMENT LICENSE RIGHTS

This invention was made with Government support under Contract No. DE-NA0003525 awarded by the United States Department of Energy/National Nuclear Security Administration. The United States Government has certain rights in this invention.

BACKGROUND INFORMATION

1. Field

The present disclosure relates generally to image processing and to systems and methods for processing X-ray tomography images. More particularly, illustrative embodiments are directed to reconstructing edges of computed tomography images.

2. Background

X-ray computed tomography (CT) provides three-dimensional characterization of complex structures. X-ray computed tomography includes acquiring a series of X-ray images of an object as it rotates (typically 360°) between the X-ray source and detector. These images, or projections, are then used to produce a three-dimensional volume of the object being investigated, a process known as image reconstruction. The result is an image or a stack of images, where each image represents a thin cross-sectional slice of the object being imaged.

Therefore, it would be desirable to have systems, methods and products that take into account at least some of the issues discussed above, as well as other possible issues.

SUMMARY

An illustrative embodiment provides a computer-implemented method of reconstructing boundaries from a computed tomography (CT) image dataset. The method comprises receiving CT image data and applying a number of image filters to the CT image data. A numerical derivative is applied to the filtered CT image data to flatten and suppress non-edge regions that do not correspond to edges. Numerical derivative values are clipped to a specified range to reduce artifacts and noise, and an X-ray image is reconstructed according to the image filters and clipped numerical derivative values.

Another illustrative embodiment provides a system for reconstructing boundaries from a computed tomography (CT) image dataset. The system comprises a storage device configured to store program instructions and one or more processors operably connected to the storage device and configured to execute the program instructions to cause the system to: receive CT image data; apply a number of image filters to the CT image data; apply a numerical derivative to the filtered CT image data to flatten and suppress non-edge regions that do not correspond to edges; clip numerical derivative values to a specified range to reduce artifacts and noise; and reconstruct an X-ray image according to the image filters and clipped numerical derivative values.

Another illustrative embodiment provides a computer program product for reconstructing boundaries from a computed tomography (CT) image dataset. The computer program product comprises a computer-readable storage medium having program instructions embodied thereon to perform the steps of: receiving CT image data; applying a number of image filters to the CT image data; applying a numerical derivative to the filtered CT image data to flatten and suppress non-edge regions that do not correspond to edges; clipping numerical derivative values to a specified range to reduce artifacts and noise; and reconstructing an X-ray image according to the image filters and clipped numerical derivative values.

Another illustrative embodiment provides a computer-implemented method of reconstructing boundaries from a computed tomography (CT) image dataset. The method comprises receiving CT image data and creating a sinogram from the CT image data. A number of image filters are applied to the sinogram, and then a numerical derivative is applied to the filtered sinogram to flatten and suppress non-edge regions that do not correspond to edges. Numerical derivative values are clipped to a specified range to reduce artifacts and noise. The sinogram is reformatted to a radiograph, and an X-ray image is reconstructed according to the image filters and clipped numerical derivative values.

Another illustrative embodiment provides a system for reconstructing boundaries from a computed tomography (CT) image dataset. The system comprises a storage device configured to store program instructions and one or more processors operably connected to the storage device and configured to execute the program instructions to cause the system to: receive CT image data; create a sinogram from the CT image data; apply a number of image filters to the sinogram; apply a numerical derivative to the filtered sinogram to flatten and suppress non-edge regions that do not correspond to edges; clip numerical derivative values to a specified range to reduce artifacts and noise; reformat the sinogram to a radiograph; and reconstruct an X-ray image according to the image filters and clipped numerical derivative values.

Another illustrative embodiment provides a computer program product for reconstructing boundaries from a computed tomography (CT) image dataset. The computer program product comprises a computer-readable storage medium having program instructions embodied thereon to perform the steps of: receiving CT image data; creating a sinogram from the CT image data; applying a number of image filters to the sinogram; applying a numerical derivative to the filtered sinogram to flatten and suppress non-edge regions that do not correspond to edges; clipping numerical derivative values to a specified range to reduce artifacts and noise; reformatting the sinogram to a radiograph; and reconstructing an X-ray image according to the image filters and clipped numerical derivative values.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments described herein recognize and take into account different considerations. For example, the illustrative embodiments recognize and take into account that it is desirable to improve edge detection of objects in images in an effective and efficient manner.

The illustrative embodiments also recognize and take into account that in many applications (e.g., manufacturing), the primary areas of interest in CT imaging are the interfaces where component are connected to each other rather than flat fields of dense material.

The illustrative embodiments provide a method for reconstructing edges in CT imaged. A numerical derivative is applied to CT image to emphasize segment interfaces and flatten and suppress regions that do not correspond to edges. An X-ray is then reconstructed from the derivative values of the CT image data.

Figure 1:
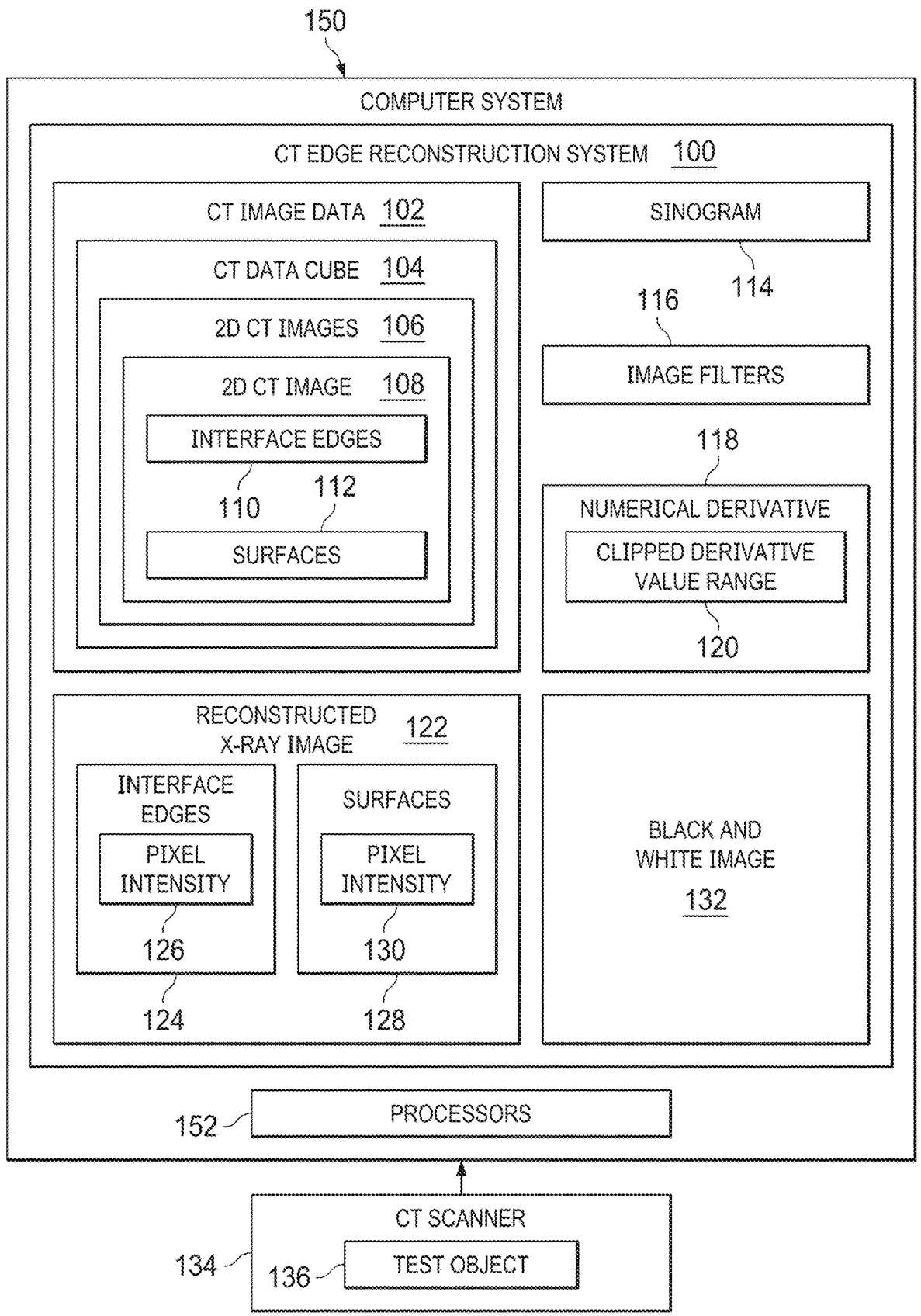
FIG. 1 depicts an illustration of a block diagram of an X-ray computed tomography (CT) edge reconstruction system in accordance with an illustrative embodiment.

Turning to FIG. 1, an illustration of a block diagram of an X-ray computed tomography (CT) edge reconstruction system is depicted in accordance with an illustrative embodiment. CT edge reconstruction system 100 receives CT image data 102 from a CT scanner 134 related to a text object 136 (e.g., a printed circuit board).

Figure 2:
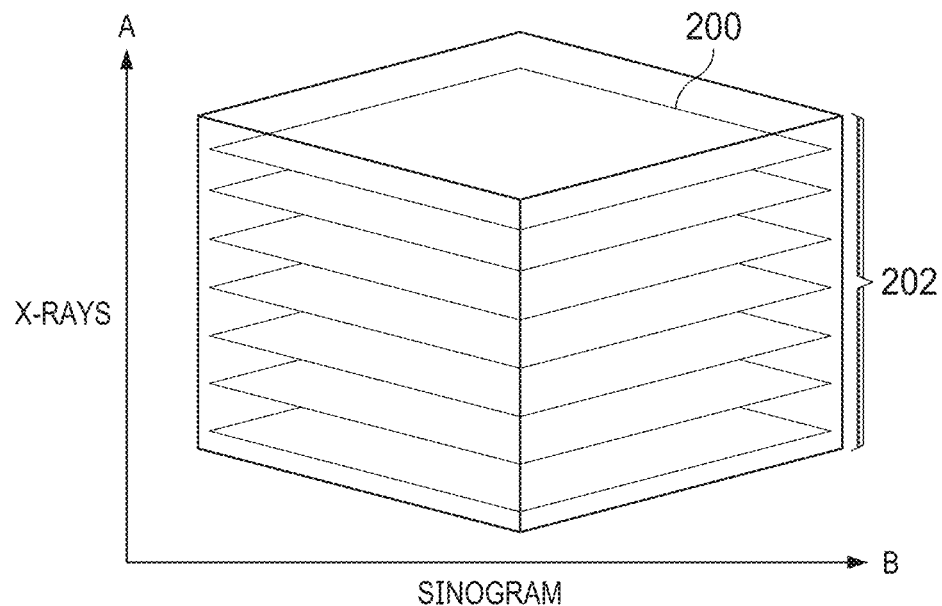
FIG. 2 depicts a CT image data cube in accordance with an illustrative embodiment.

CT image data 102 comprises a number of two-dimensional (2D) CT images 106 (slices) that are stacked together to form a data cube 104 (see FIG. 2). Each 2D CT image 108 comprises interfaces edges 110 and surfaces 112. In some embodiments, the CT image data 102 may be used to generate a sinogram 114 which is constructed perpendicularly to the direction of X-rays.

CT edge reconstruction system 100 may apply a number of image filters 116 to the CT image data 102 or sinogram 114. Examples of image filters may include Prewitt, Zero-cross, and Sobel filters.

CT edge reconstruction system 100 also apples a numerical derivative 118 to the CT image data 102 or sinogram 114. Taking the numerical derivative 118 highlights edges or boundaries and suppresses regions where little is changing (i.e., flat non-edge regions). Various numerical derivatives have been tested and the majority seem to work for various data sets. For example, left justified derivative and the four-sided derivative provided robust results. The illustrative embodiments may limit the numerical derivative values to a clipped range 120 in order to reduce artifacts and minimize noise.

Once the derivative image is taken, a derivate X-ray image 122 is reconstructed in a traditional manner of a CT reconstruction. Reconstructed X-ray image 122 comprises interface edges 124 and surfaces 128 (non-edge regions). Both interface edges 124 and surfaces 128 have respective pixel intensities 126, 130. Taking the numerical derivative 118 results in only surfaces and boundaries being reconstructed as bright pixels versus dark pixels. Non-edge regions 128 are reconstructed to zero pixel intensity while interface edge 124 regions are reconstructed with 255 pixel brightness (0-255 grayscale). Using the example of a printed circuit board (PCB), the advantage of this approach is to target regions of trace/via information only and not the substrate.

CT edge reconstruction system 100 may also generate a black and white image 132 from the reconstructed X-ray image. The black and white image 132 may serve as a starting point for Gerber formatting for design and manufacturing applications.

CT edge reconstruction system 100 can be implemented in software, hardware, firmware, or a combination thereof. When software is used, the operations performed by CT edge reconstruction system 100 can be implemented in program code configured to run on hardware, such as a processor unit. When firmware is used, the operations performed by CT edge reconstruction system 100 can be implemented in program code and data and stored in persistent memory to run on a processor unit. When hardware is employed, the hardware may include circuits that operate to perform the operations in CT edge reconstruction system 100.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for CT edge reconstruction system 100 can be located in computer system 150, which is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

For example, CT edge reconstruction system 100 can run on one or more processors 152 in computer system 150. As used herein a processor is a hardware device and is comprised of hardware circuits such as those on an integrated circuit that respond and process instructions and program code that operate a computer. When processors 152 execute instructions for a process, one or more processors can be on the same computer or on different computers in computer system 150. In other words, the process can be distributed between processors 152 on the same or different computers in computer system 150. Further, one or more processors 152 can be of the same type or different type of processors 152. For example, one or more processors 152 can be selected from at least one of a single core processor, a dual-core processor, a multi-processor core, a general-purpose central processing unit (CPU), a graphics processing unit (GPU), a digital signal processor (DSP), or some other type of processor.

CT edge reconstruction system 100 makes computer system 150 a special purpose computer capable of producing enhanced X-ray images. By enhancing edges and suppressing non-edge regions, CT edge reconstruction system 100 improves computational efficiency of X-ray image reconstruction as well as delivers improved image quality that requires less post-processing than conventional CT imaging computing systems.

FIG. 2 depicts a CT image data cube in accordance with an illustrative embodiment. CT image data cube 200 comprises a number of successive 2D CT images 202 that are stacked together in the direction of the X-rays (arrow A). The illustrative embodiments may construct a sinogram image by using data in a direction orthogonal to the X-ray path (indicated by arrow B).

Figure 3:
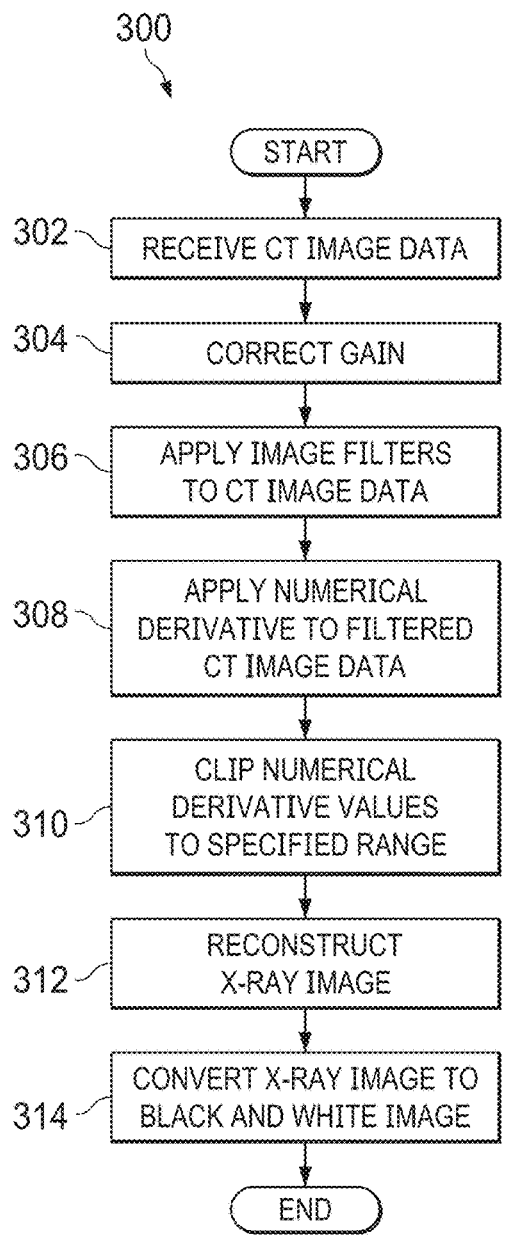
FIG. 3 depicts a flowchart illustrating a process for CT edge reconstruction in accordance with an illustrative embodiment.

FIG. 3 depicts a flowchart illustrating a process for CT edge reconstruction in accordance with an illustrative embodiment. Process 300 can be implemented in hardware, software, or both. When implemented in software, the process can take the form of program code that is run by one or more processor units located in one or more hardware devices in one or more systems. Process 300 may be implemented in CT edge reconstruction system 100 in FIG. 1.

Process 300 begins by receiving CT image data from a CT scanner (step 302). The system then performs standard CT gain correction to correct for pixel variation (step 304).

Process 300 then applies a number of image filters to the CT image data (step 306). The image filters may comprise one of Prewitt, Zerocross, or Sobel filters. Process 300 then applies a numerical derivative to the filtered CT image data to flatten and suppress non-edge regions that do not correspond to edges (see FIG. 5B) (step 308). The numerical derivative may comprise the four-sided derivative or left justified derivative.

The numerical derivative values are clipped to a specified range to reduce artifacts and noise (step 310). Clipping the range of numerical derivative values reduces artifacts and noise caused by high absorption, beam hardening, and noise from the numerical derivative. Suppressing the range too much may reduce the finer features, while not clipping the numerical derivate values may carry over or magnify noise from the initial image data. These effects depend on the X-ray penetration of the article, and the density of the article will determine clipping ranges.

The X-ray image is then reconstructed according to the image filters and clipped numerical derivative values (step 312). This reconstruction may be performed with standard CT reconstruction software (e.g., NSI and RECON software developed by Sandia National Laboratories).

Optionally, the reconstructed X-ray image may then be converted to a black and white image (see FIG. 5C) (step 314). Process 300 then ends.

Figure 4:
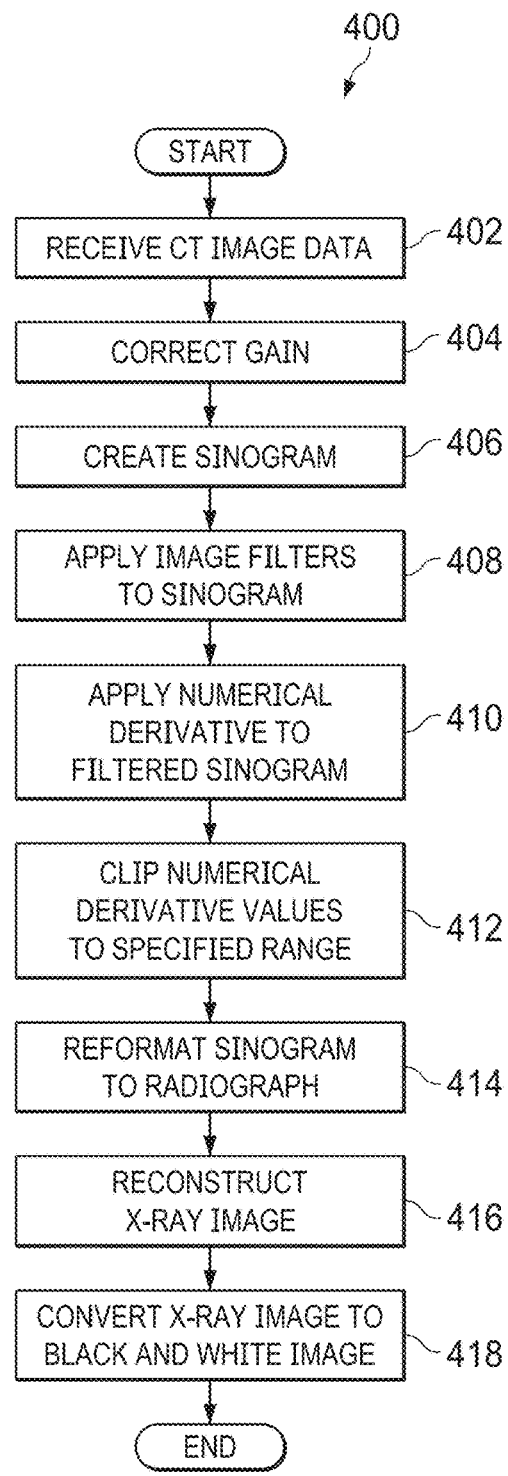
FIG. 4 depicts a flowchart illustrating a process for CT edge reconstruction with a sinogram in accordance with an illustrative embodiment.

FIG. 4 depicts a flowchart illustrating a process for CT edge reconstruction with a sinogram in accordance with an illustrative embodiment. Process 400 can be implemented in hardware, software, or both. When implemented in software, the process can take the form of program code that is run by one or more processor units located in one or more hardware devices in one or more systems. Process 400 may be implemented in CT edge reconstruction system 100 in FIG. 1.

Process 400 begins by receiving CT image data from a CT scanner (step 402). The system then performs standard CT gain correction to correct for pixel variation (step 404).

Process 400 then creates a sinogram from the CT input data (step 406) and applies a number of image filters to the sinogram (step 408). The image filters may comprise one of Prewitt, Zerocross, or Sobel filters. Process 400 then applies a numerical derivative to the filtered sinogram to flatten and suppress non-edge regions that do not correspond to edges (see FIG. 5B) (step 410). The numerical derivative may comprise the four-sided derivative or left justified derivative.

The numerical derivative values are clipped to a specified range to reduce artifacts and noise (step 412). Suppressing the range too much may reduce the finer features, while not clipping the numerical derivate value will carry over or magnify noise from the initial image data. Dependence includes the X-ray penetration of the article, and the density of the article will determine clipping ranges.

The sinogram is then reformatted to a radiograph to facilitate reconstruction (depending on the software package used) (step 414). The X-ray image is then reconstructed according to the image filters and clipped numerical derivative values (step 416). This reconstruction may be performed with standard CT reconstruction software (e.g., NSI and RECON software developed by Sandia National Laboratories).

Optionally, the reconstructed X-ray image may then be converted to a black and white image (see FIG. 5C) (step 418). Process 400 then ends.

Figure 5A:
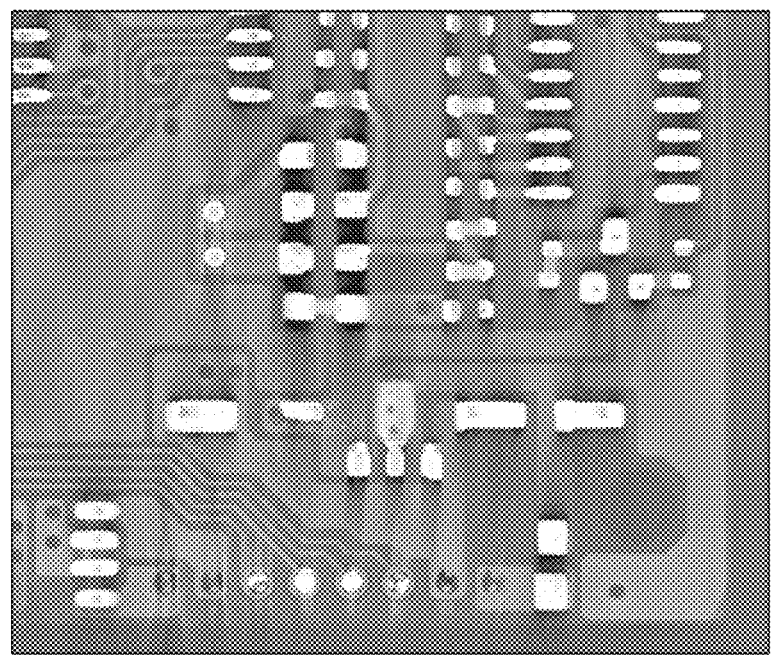
FIG. 5A depicts an example of an unfiltered X-ray image of a printed circuit board in accordance with the prior art.

FIG. 5A depicts an example of an unfiltered X-ray image of a printed circuit board in accordance with the prior art. In comparison to the filtered image in FIG. 5B, the unfiltered X-ray image in FIG. 5A displays more streaking artifacts and greater visibility of the flat fields of dense material.

Figure 5B:
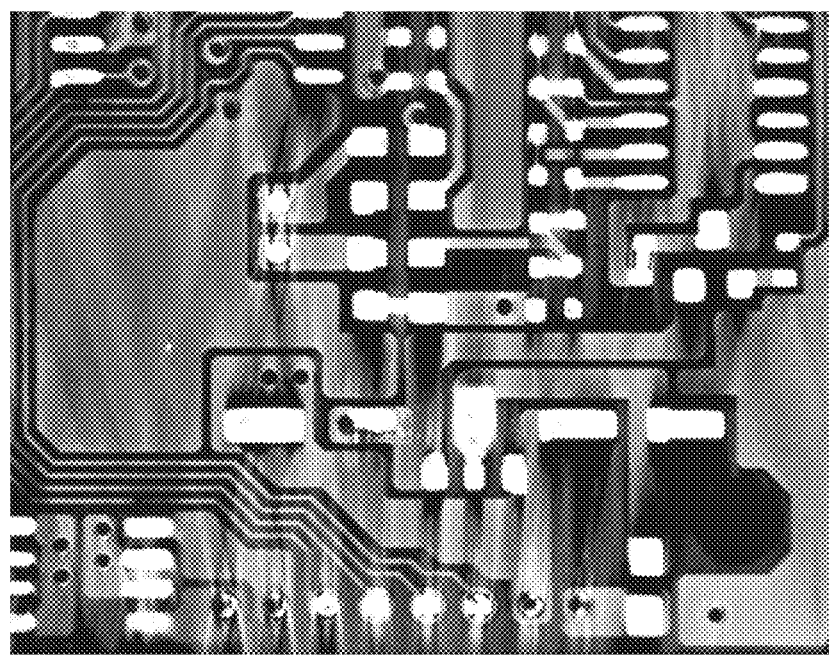
FIG. 5B depicts an example of a filtered reconstructed X-ray image of a printed circuit board in accordance with the illustrative embodiments.

FIG. 5B depicts an example of a filtered reconstructed X-ray image of a printed circuit board in accordance with the illustrative embodiments. The filtered reconstructed X-ray image in FIG. 5B displays significantly less streaking artifacts, and edges are enhanced compared to background pixel values. The edge enhancement provides improved visualization of connections between components over unfiltered CT imaging without having to reconstruct dense materials in flat regions that are of less interest.

Figure 5C:
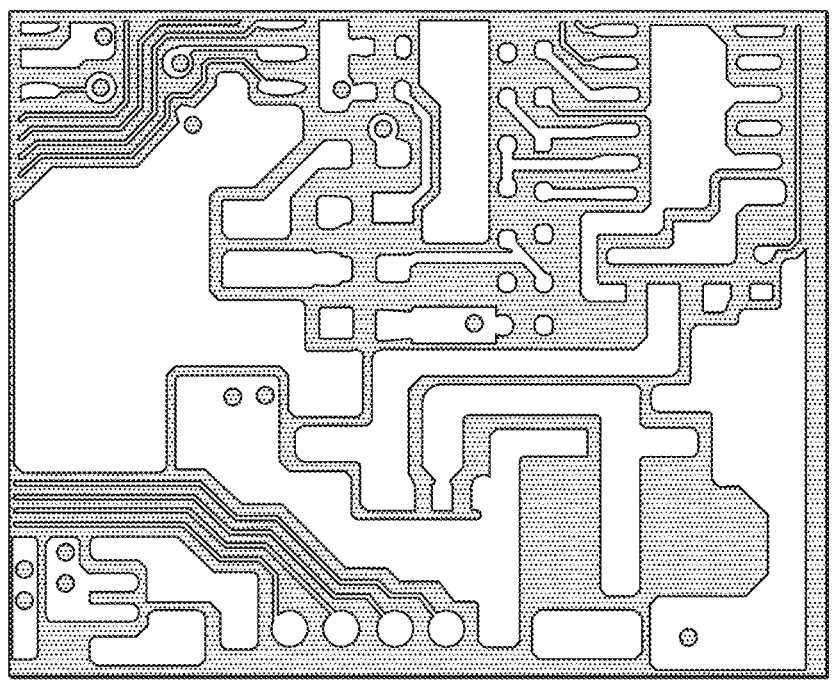
FIG. 5C depicts an example of a black and white histogram derived from a filtered reconstructed X-ray image of a printed circuit board in accordance with the illustrative embodiments.

FIG. 5C depicts an example of a black and white histogram derived from a filtered reconstructed X-ray image of a printed circuit board in accordance with the illustrative embodiments. The black and white image can serve as "ideal" histogram data, which may be used as a starting point for automated manufacturing processes (e.g., Gerber format). The higher quality the black and white starting point is, the better use the design/manufacturing team can make of automated tools in the commercial vectorization tools.

Figure 6:
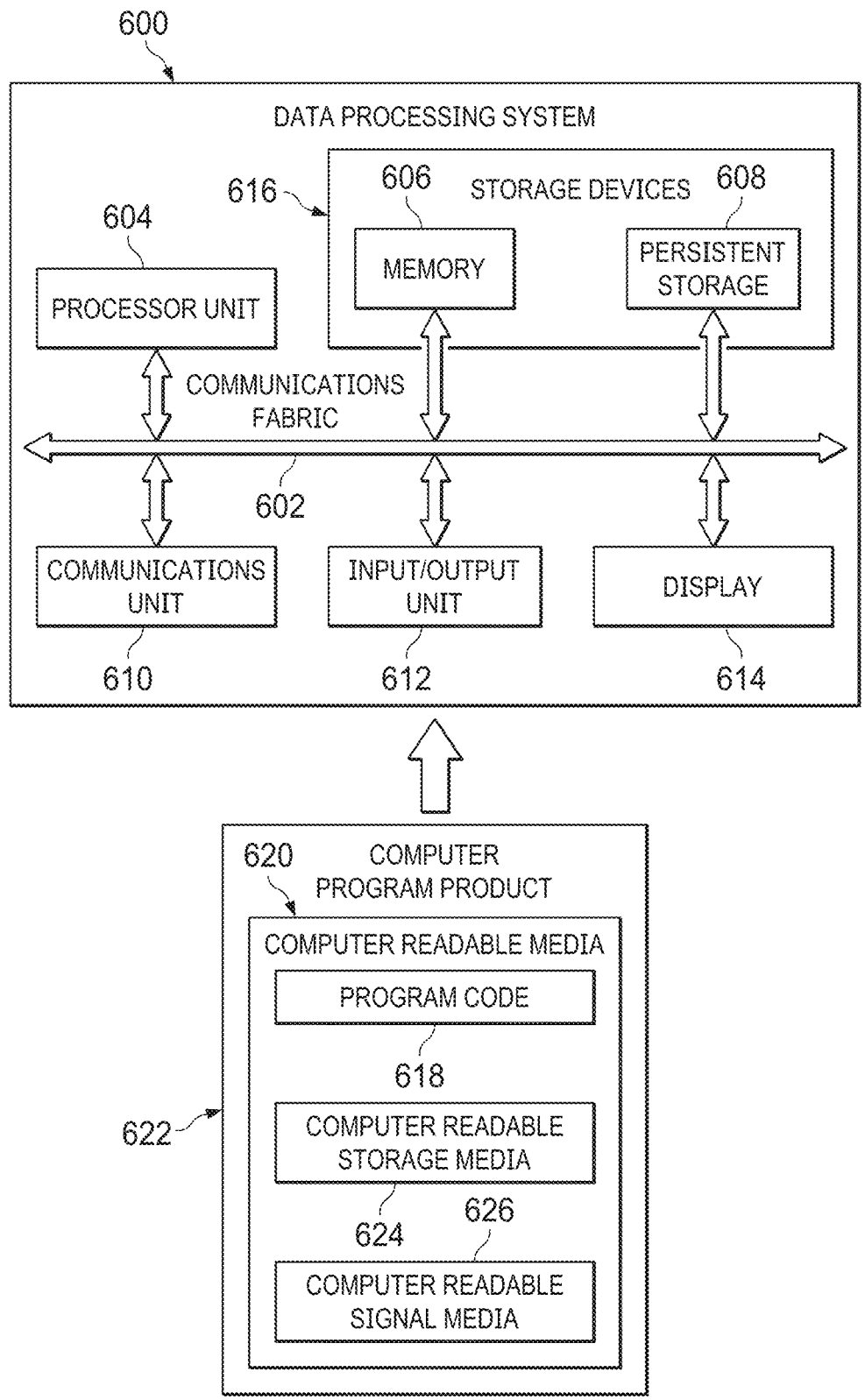
FIG. 6 is an illustration of a block diagram of a data processing system in accordance with an illustrative embodiment.

Turning to FIG. 6, an illustration of a block diagram of a data processing system is depicted in accordance with an illustrative embodiment. Data processing system 600 is an example of one possible implementation of a data processing system for performing functions of a CT edge reconstruction system in accordance with an illustrative embodiment. For example, data processing system 600 is an example of one possible implementation of a data processing system for implementing the CT edge reconstruction system 100 in FIG. 1.

In this illustrative example, data processing system 600 includes communications fabric 602. Communications fabric 602 provides communications between processor unit 604, memory 606, persistent storage 608, communications unit 610, input/output (I/O) unit 612, and display 614. Memory 606, persistent storage 608, communications unit 610, input/output (I/O) unit 612, and display 614 are examples of resources accessible by processor unit 604 via communications fabric 602.

Processor unit 604 serves to run instructions for software that may be loaded into memory 606. Processor unit 604 may be a number of processors, a multi-processor core, or some other type of processor, depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and other suitable information either on a temporary basis or a permanent basis. Storage devices 616 also may be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program instructions, program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 1108. Computer readable storage media 624 also may take the form of a persistent storage, such as a hard drive, a thumb drive, or a flash memory, that is connected to data processing system 600. In some instances, computer readable storage media 624 may not be removable from data processing system 600.

In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code. As one example, data processing system 600 may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system.

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in communications fabric 602.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of reconstructing boundaries from a computed tomography (CT) image dataset, the method comprising:
   using a number of processors to perform the steps of:
   receiving CT image data;
   applying a number of image filters to the CT image data;
   applying a numerical derivative to the filtered CT image data to flatten and suppress non-edge regions that do not correspond to edges;
   clipping numerical derivative values to a specified range to reduce artifacts and noise; and
   reconstructing an X-ray image according to the image filters and clipped numerical derivative values.

2. The method of claim 1, further comprising converting the reconstructed X-ray image into a black and white image.

3. The method of claim 1, wherein the numerical derivative comprises one of:
   four-sided derivative; or
   left justified derivative.

4. The method of claim 1, wherein non-edge regions within the X-ray image are reconstructed to zero pixel intensity.

5. The method of claim 1, wherein edge regions within the X-ray image are reconstructed to 255 pixel intensity on a 0-255 grayscale.

6. The method of claim 1, wherein the image filters comprise at least one of:
   Prewitt;
   Zerocross; or
   Sobel.

7. A system for reconstructing boundaries from a computed tomography (CT) image dataset, the system comprising:
   a storage device configured to store program instructions; and
   one or more processors operably connected to the storage device and configured to execute the program instructions to cause the system to:
   receive CT image data;
   apply a number of image filters to the CT image data;
   apply a numerical derivative to the filtered CT image data to flatten and suppress non-edge regions that do not correspond to edges;
   clip numerical derivative values to a specified range to reduce artifacts and noise; and
   reconstruct an X-ray image according to the image filters and clipped numerical derivative values.

8. The system of claim 7, wherein the processors further execute program instructions to convert the reconstructed X-ray image into a black and white image.

9. A computer program product for reconstructing boundaries from a computed tomography (CT) image dataset, the computer program product comprising:
   a non-transitory computer-readable storage medium having program instructions embodied thereon to perform the steps of:
      receiving CT image data;
      applying a number of image filters to the CT image data;
      applying a numerical derivative to the filtered CT image data to flatten and suppress non-edge regions that do not correspond to edges;
      clipping numerical derivative values to a specified range to reduce artifacts and noise; and
      reconstructing an X-ray image according to the image filters and clipped numerical derivative values.

10. The computer program product of claim 9, further comprising instructions for converting the reconstructed X-ray image into a black and white image.

11. A computer-implemented method of reconstructing boundaries from a computed tomography (CT) image dataset, the method comprising:
   using a number of processors to perform the steps of:
      receiving CT image data;
      creating a sinogram from the CT image data;
      applying a number of image filters to the sinogram;
      applying a numerical derivative to the filtered sinogram to flatten and suppress non-edge regions that do not correspond to edges;
      clipping numerical derivative values to a specified range to reduce artifacts and noise;
      reformatting the sinogram to a radiograph; and
      reconstructing an X-ray image according to the image filters and clipped numerical derivative values.

12. The method of claim 11, further comprising converting the reconstructed X-ray image into a black and white image.

13. The method of claim 11, wherein the numerical derivative comprises one of:
   four-sided derivative; or
   left justified derivative.

14. The method of claim 11, wherein non-edge regions within the X-ray image are reconstructed to zero pixel intensity.

15. The method of claim 11, wherein edge regions within the X-ray image are reconstructed to 255 pixel intensity on a 0-255 grayscale.

16. The method of claim 11, wherein the image filters comprise at least one of:
   Prewitt;
   Zerocross; or
   Sobel.

17. A system for reconstructing boundaries from a computed tomography (CT) image dataset, the system comprising:
   a storage device configured to store program instructions; and
   one or more processors operably connected to the storage device and configured to execute the program instructions to cause the system to:
      receive CT image data;
      create a sinogram from the CT image data;
      apply a number of image filters to the sinogram;
      apply a numerical derivative to the filtered sinogram to flatten and suppress non-edge regions that do not correspond to edges;
      clip numerical derivative values to a specified range to reduce artifacts and noise;
      reformat the sinogram to a radiograph; and
      reconstruct an X-ray image according to the image filters and clipped numerical derivative values.

18. The system of claim 17, wherein the processors further execute program instructions to convert the reconstructed X-ray image into a black and white image.

19. A computer program product for reconstructing boundaries from a computed tomography (CT) image dataset, the computer program product comprising:
   a non-transitory computer-readable storage medium having program instructions embodied thereon to perform the steps of:
      receiving CT image data;
      creating a sinogram from the CT image data;
      applying a number of image filters to the sinogram;
      applying a numerical derivative to the filtered sinogram to flatten and suppress non-edge regions that do not correspond to edges;
      clipping numerical derivative values to a specified range to reduce artifacts and noise;
      reformatting the sinogram to a radiograph; and
      reconstructing an X-ray image according to the image filters and clipped numerical derivative values.

20. The computer program product of claim 19, further comprising instructions for converting the reconstructed X-ray image into a black and white image.

* * * * *